(12) United States Patent
Patel et al.

(10) Patent No.: US 8,116,687 B2
(45) Date of Patent: Feb. 14, 2012

(54) DYNAMIC FREQUENCY SELECTION IN WIRELESS DEVICES

(75) Inventors: Vijaykumar M. Patel, Fairfax, VA (US); Michael M. Hoghooghi, Austin, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 938 days.

(21) Appl. No.: 11/782,992

(22) Filed: Jul. 25, 2007

(65) Prior Publication Data

US 2009/0028097 A1    Jan. 29, 2009

(51) Int. Cl.
H04B 1/00 (2006.01)
H04B 17/00 (2006.01)
H04B 1/04 (2006.01)
H04B 1/10 (2006.01)

(52) U.S. Cl. ............... 455/63.1; 455/67.13; 455/114.2; 455/296

(58) Field of Classification Search .......... 455/501–526, 455/63.1–63.4, 65, 67.13, 114.2–115.4; 370/329–334, 341, 348, 437–438, 442–444
See application file for complete search history.

(56) References Cited

U.S. PATENT DOCUMENTS

| | | | |
|---|---|---|---|
| 5,095,531 A * | 3/1992 | Ito | 455/435.3 |
| 6,118,403 A | 9/2000 | Lang | |
| 6,201,493 B1 | 3/2001 | Silverman | |
| 6,204,798 B1 | 3/2001 | Fleming, III | |
| 6,411,896 B1 | 6/2002 | Shuman et al. | |
| 6,442,143 B1 * | 8/2002 | Corry | 370/252 |
| 6,483,452 B1 | 11/2002 | Iwakini | |
| 6,670,905 B1 | 12/2003 | Orr | |
| 6,891,496 B2 | 5/2005 | Husted et al. | |
| 6,957,067 B1 * | 10/2005 | Iyer et al. | 455/435.1 |
| RE39,038 E | 3/2006 | Fleming, III | |
| 7,124,006 B2 | 10/2006 | Davidson et al. | |
| 2003/0218562 A1 | 11/2003 | Orr | |
| 2004/0151137 A1 | 8/2004 | McFarland et al. | |
| 2004/0156336 A1 | 8/2004 | McFarland et al. | |
| 2006/0212196 A1 | 9/2006 | Davidson et al. | |
| 2006/0217137 A1 * | 9/2006 | Kushalnagar et al. | 455/501 |
| 2008/0146155 A1 * | 6/2008 | Makhlouf et al. | 455/63.1 |

FOREIGN PATENT DOCUMENTS

| | | |
|---|---|---|
| EP | 0991044 B1 | 12/2004 |
| EP | 1405124 B1 | 11/2005 |
| EP | 1693814 A2 | 8/2006 |
| EP | 1633608 B1 | 11/2006 |
| GB | 2326751 A | 12/1998 |
| JP | 10282220 | 10/1998 |
| JP | 20026033 | 1/2002 |
| JP | 200398252 | 4/2003 |
| WO | 0029869 | 5/2000 |
| WO | 0077539 A1 | 12/2000 |
| WO | 2004110828 A1 | 12/2004 |

* cited by examiner

*Primary Examiner* — Thai Hoang

(57) ABSTRACT

A method in a communication network comprising a plurality of network controllers and a plurality of mobile nodes served by at least one of the plurality of network controllers is provided. The method includes the plurality of network controllers coordinating interference avoidance by co-operatively generating an interference avoidance database. The method further includes at least one of the plurality of network controllers updating the interference avoidance database, wherein updating the interference avoidance database includes receiving at least one interference avoidance related information from at least one of the plurality of mobile nodes. The method further includes the at least one of the plurality of network controllers communicating the updated interference avoidance database to at least one another of the plurality of network controllers

19 Claims, 4 Drawing Sheets

| | PRIMARY USER | 1 | 2 | 3 | | N |
|---|---|---|---|---|---|---|
| 72 | | | | | | |
| 74 | LOCATION | 22°/38° | 23°/40° | 30°/45° | | 27°/35° |
| 76 | PRF | 200 PPS | UNKNOWN | 450 PPS | | 600 PPS |
| 78 | SPECTRUM | 4.7-5 GHz | 67-68 GHz | 4.9-5.1 GHz | ... | 30-31 GHz |
| 80 | SIGNAL STRENGTH | -55 dBm | -60 dBm | -70 dBm | | -50 dBm |
| 82 | ACTIVE TIME | 2 PM -3 PM | UNKNOWN | 10 AM/ 4 PM | | 5 PM -6 PM |
| 84 | FREQUENCY OF ACTIVITY | 1/DAY | UNKNOWN | 2/DAY | | 1/WEEK |
| 86 | PERIOD OF ACTIVITY | 10 SECONDS | UNKNOWN | 2 SECONDS | | 1 MINUTE |
| 88 | TYPE | RADAR | RADAR | RADAR | | RADAR |

| 152 – | NETWORK CONTROLLER | 1 | 2 | 3 | ... | L |
|---|---|---|---|---|---|---|
| 154 – | CURRENT CHANNEL | 6 | 8 | 1 | | 2 |
| 156 – | PREFERRED INTERFERENCE AVOIDANCE CHANNLES | 7, 11, 2 | 3, 1, 4, 5 | 1, 5, 6 | | 3, 7, 9 |
| 158 – | CHANNELS TO AVOID | 5 | 2 | 7 | | 1 |

*FIG. 6*

DYNAMIC FREQUENCY SELECTION IN WIRELESS DEVICES

BACKGROUND

1. Field

This disclosure relates generally to communication systems and methods, and more specifically, to dynamic frequency selection in wireless devices.

2. Related Art

Increasingly, wireless applications are being deployed in bands that are used by other applications. For example, wireless local area networks (WLANs) are being deployed in frequency bands that are used by radar applications. In addition, increasingly, automobiles have radar based navigation and collision avoidance systems that may operate in the same spectrum as other radar applications. To prevent interference with existing radar applications, regulatory agencies are requiring WLAN devices to incorporate a dynamic frequency selection (DFS) feature. The DFS feature requires a WLAN device to scan a channel for at least a certain amount of time, prior to commencing operation on the channel. The required scan time is problematic for applications, such as voice over IP and video that require real-time service. In particular, voice over IP and video applications suffer with poor quality of service when the WLAN device cannot respond in real time to a request for service. Similarly, in automobile related applications, an automobile radar may not be able to deliver the expected quality of service, if the automobile radar has to scan a channel for a certain amount of time prior to commencing operation.

Accordingly, there is a need for methods and systems for improved dynamic frequency selection in wireless devices.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

FIG. 6 is a diagram illustrating a portion of the exemplary interference avoidance database.

DETAILED DESCRIPTION

Figure 1:
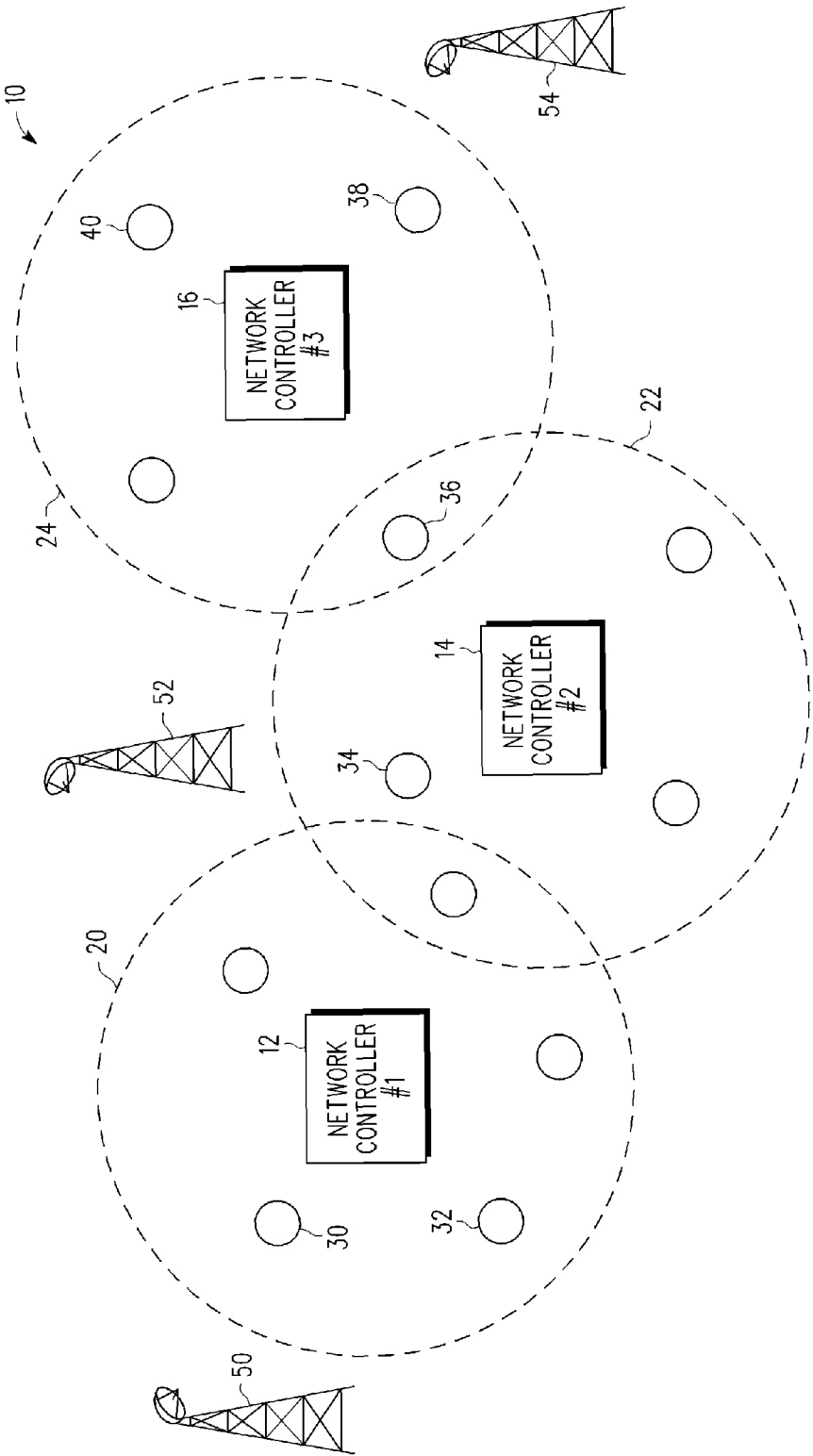
FIG. 1 is an exemplary block diagram of a communication environment.

In one aspect, a method in a communication network comprising a plurality of network controllers and a plurality of mobile nodes served by at least one of the plurality of network controllers is provided. The method includes the plurality of network controllers coordinating interference avoidance by co-operatively generating an interference avoidance database. The method further includes at least one of the plurality of network controllers updating the interference avoidance database, wherein updating the interference avoidance database includes receiving at least one interference avoidance related information from at least one of the plurality of mobile nodes. The method further includes the at least one of the plurality of network controllers communicating the updated interference avoidance database to at least one another of the plurality of network controllers. Thus, network controllers, such as access stations in a wireless network may collect information concerning other users of the frequency resource in a distributed manner. The network controllers may then pass the collected information onto a central coordinator for generating interference avoidance related information.

In another aspect, a method in a communication network comprising a plurality of network controllers and a plurality of mobile nodes served by at least one of the plurality of network controllers is provided. The method includes the plurality of network controllers coordinating interference avoidance by co-operatively generating an interference avoidance database, wherein generating the interference avoidance database comprises exchanging at least one interference avoidance related information between the plurality of network controllers. The method further includes at least one of the plurality of network controllers generating a channel database, wherein the channel database comprises information concerning a channel for the at least one of the plurality of network controllers that the at least one of the plurality of network controllers may switch to in the presence of interference on the channel.

In yet another aspect, a method in a communication network comprising a plurality of network controllers and a plurality of mobile nodes served by at least one of the plurality of network controllers is provided. The method includes the plurality of network controllers coordinating interference avoidance by co-operatively generating an interference avoidance database, wherein generating the interference avoidance database comprises exchanging at least one interference avoidance related information between the plurality of network controllers, wherein the interference avoidance database comprises information concerning at least one primary user of a channel corresponding to the communication network, and wherein the information concerning the at least one primary user of the channel comprises information concerning a radar including at least one of location information, a pulse repetition frequency of the radar, a usage spectrum related to the radar, a signal strength corresponding to the radar, an active time corresponding to the radar, a frequency of activity of the radar, a period of activity of the radar, and a type of the radar. The method further includes at least one of the plurality of network controllers generating a channel database, wherein the channel database comprises information concerning a channel for the at least one of the plurality of network controllers that the at least one of the plurality of network controllers may switch to in the presence of interference on the channel.

FIG. 1 is an exemplary block diagram of a communication environment 10. Communication environment 10 may include various communication networks 20, 22, and 24. Each communication network may be a wireless local area network (WLAN), for example. Each communication network may include various network entities, such as network controllers and mobile nodes. For example, communication network 20 may include network controller #1 12 and mobile nodes 30 and 32. Communication network 22 may include network controller #2 14 and mobile nodes 34 and 36. Communication network 24 may include network controller #3 16 and mobile nodes 36, 38, and 40. Thus, mobile node 36 may be a part of two communication networks. Each network controller may operate in a particular frequency band and may communicate with each mobile node on a particular channel frequency. A channel, as used herein, refers to the common frequency that is used for communication between a network controller and a mobile node. The channel may include other means for communication between the network controller and the mobile node. A network controller may support a certain number of frequency channels, for example 6-12. FIG. 1 further shows radars 50, 52, and 54, which may cause interference with communication in communication environment 10. Radars 50, 52, and 54 may be radars being used for geographical sensing, remote sensing, space programs, defense related programs, or for other purposes. Radars 50, 52, and 54 may generate high frequency pulsed data at various times. Pulsed data may be generated at a certain pulse repetition frequency (PRF). Radar 50, for example, may be a defense related radar, which may become active only once a week for a few seconds only. Other radars may be active at other times. Regardless, when radars 50, 52, and 54 may become active, they may cause interference with communication on any of the channels associated with network controllers 12, 14, and 16.

Figures 2, 3:
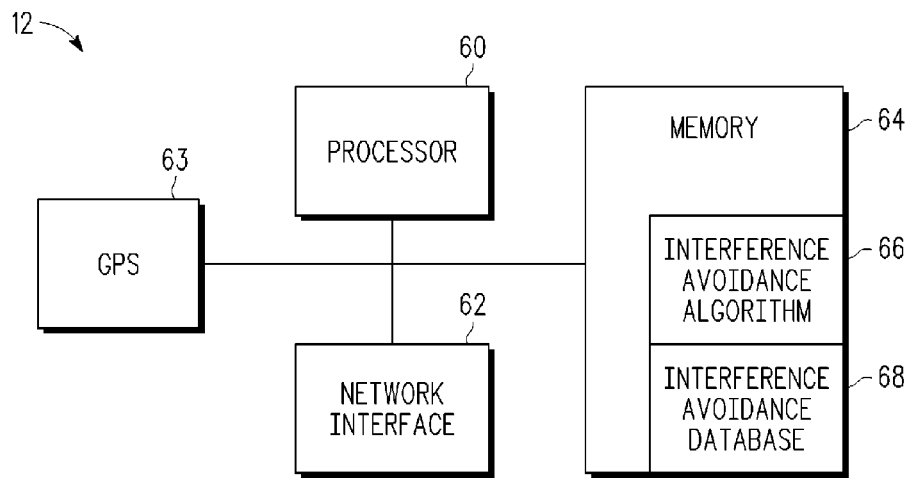
FIG. 2 is a block diagram illustrating an exemplary network controller.
FIG. 3 is a diagram illustrating a portion of an exemplary interference avoidance database.

FIG. 2 is a block diagram illustrating an exemplary network controller 12. Network controller 12 may include a processor 60, a network interface 62, a geographic positioning sensor (GPS) 63, and a memory 64. Network controller 12 may include additional components. Processor 60 may execute applications stored in memory 64 and may access/update data stored in any databases in memory 64. Network interface 62 may include hardware/software functionality needed to communicate in communication environment 10 using any relevant communication protocol. For example, in one embodiment, network interface may facilitate communication using the IEEE 802.11 standard. Memory 64 may include an interference avoidance algorithm 66 and an interference avoidance database 68. Interference avoidance algorithm 66 may be a software program that when executed by processor 60 may perform functionality associated with interference avoidance algorithm 66. Interference avoidance database 68 may be a relational database and may include tables for implementing functionality associated with the various embodiments of the invention. In general, network controller 12 may maintain interference avoidance database 68. Interference avoidance database 68 may store information concerning potential interfering entities on various channels that network controllers 12, 14, and 16 may use. For example, interference avoidance database 68 may include information concerning radars 50, 52, and 54 shown in FIG. 1. Interference avoidance database 68 may also include data related to the various channels served by a particular network controller. In one embodiment, interference avoidance database 68 may be a regional database, in that, network controller 12 may use interference avoidance database 68 to help mobile nodes in a region to avoid interference. The region may include mobile nodes beyond those in a Basic Service Set (BSS) of a wireless local area network (WLAN), for example.

FIG. 3 is a diagram illustrating a table 70 of interference avoidance database 68. Table 70 of interference avoidance database 68 may be arranged as a table with several rows and columns. Each column may contain information concerning a particular primary user of a particular channel associated with at least one network controller of FIG. 1. Primary users may include radars 50, 52, and 54. Primary users may include other entities besides the radars as well. For instance, devices operating in reserved bands, such as the industrial, scientific, and medical (ISM) bands. By way of example, table 70 may contain nine rows labeled as: primary user 72, location 74, PRF 76, spectrum 78, signal strength 80, active time 82, frequency of activity 84, period of activity 86, and type 88. Primary user 72 may identify a primary user of at least one channel associated with at least one network controller. As shown in FIG. 3, primary users may number from 1 to N. Location 74 may identify a location of a corresponding primary user. Location may be expressed in terms of longitude and latitude of the primary user. Thus, for example, primary user 1 may have a location of 22°/38°. Primary user 2 may have a location of 23°/40°. Primary user 3 may have a location of 30°/45°. Primary user N may have a location of 27°/35°. Although table 70 shows the locations of primary users in terms of longitude and latitude, other indicators of location may also be used. Table 70 may further include information concerning other attributes associated with the primary users. For example, historical locations of primary users, such as radars may also be included. Thus, for example, table 70 may include previously detected locations of the primary users, besides the most recently detected location of the primary users. The locations of primary users, such as radars, when unknown to the public, may be detected by techniques, such as triangulation. Table 70 may, for example, include a pulse repetition frequency (PRF) 76 for those primary users that are radars. Thus, for example, primary user 1 may have a pulse repetition frequency of 200 pulses per second (PPS). The pulse repetition frequency of some primary users may be unknown. Primary user 2, for example, may have an unknown pulse repetition frequency. Primary user 3 may have pulse repetition frequency of 450 PPS. Primary user N may have a pulse repetition frequency of 600 PPS.

Referring still to FIG. 3, table 70 may further include spectrum 78 information concerning the various primary users. By way of example, primary user 1 may operate in a spectrum 4.7-5 GHz, primary user 2 may operate in a spectrum 67-68 GHz, primary user 3 may operate in a spectrum 4.9-5.1 GHz, and primary user N may operate in a spectrum 30-31 GHz. Table 70 may further include signal strength 80 information concerning the various primary users. For example, primary user 1 may have a signal strength of −55 dBm, primary user 2 may have a signal strength of −60 dBm, primary user 3 may have a signal strength of −70 dBm, and primary user N may have a signal strength of −50 dBm. In one embodiment, signal strength may be strength of the signal that is detected by a network controller or a mobile node associated with that network controller. Table 70 may further include active time 82 information concerning the various primary users. Active time 82 information may indicate the time of day during which a particular primary user, such as a radar, is active. For example, primary user 1 may have an active time of 2 PM-3 PM, primary user 2 may have an unknown active time, primary user 3 may have an active time of 10 AM and 4 PM, and primary user N may have an active time of 5 PM-6 PM. Table 70 may further include frequency of activity 84 information regarding the various primary users. Frequency of activity 84 information may indicate the number of times a primary user is active during a day, week, or some other time period. For example, primary user 1 may have a frequency of activity of 1/day, primary user 2 may have an unknown frequency of activity, primary user 3 may have a frequency of activity of 2/day, and primary user N may have frequency of activity of 1/week. Table 70 may further include period of activity 86 information concerning the various primary users. Period of activity 70 information may refer to the duration for which a particular primary user, for example, a radar is active on one or more channels. For example, primary user 1 may have a period of activity of 10 seconds, primary user 2 may have an unknown period of activity, primary user 3 may have a period of activity of 3 seconds, and primary user N may have a period of activity of 1 minute. Table 70 may further include type 88 information concerning the various primary users. Type 88 information may indicate whether a primary user is a radar or some other device. For example, all primary users may be radars. Type 88 may further include information, such as whether the radar is being used for geographical sensing, remote sensing, space programs, defense related programs, or for other purposes. Table 70 of interference avoidance database 68 is merely exemplary and may include additional or fewer information. Thus, for example, each primary user may not have all of the rows of information associated with it. In other words, some primary users may have additional or fewer information categories than the other primary users.

Figures 4, 5:
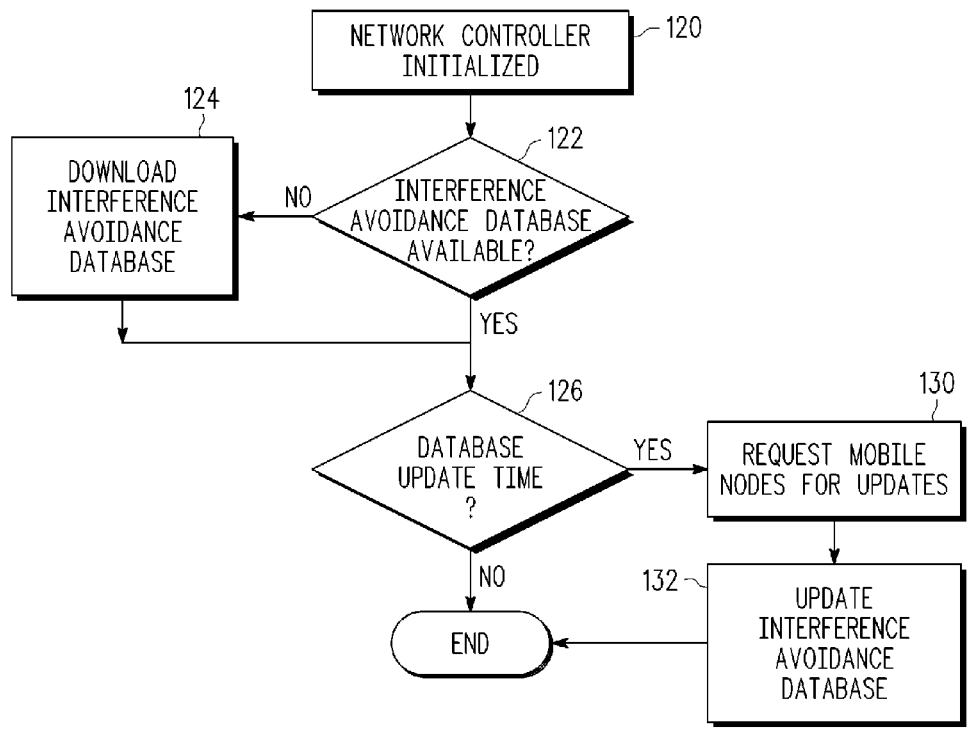
FIG. 4 is a diagram illustrating a portion of the exemplary interference avoidance database.
FIG. 5 is a flowchart of an exemplary method in a communication environment.

FIG. 4 is a diagram illustrating another table 90 of interference avoidance database 68. Table 90 of interference avoidance database 68 may be arranged as a table with several rows and columns. Each column may contain information concerning a particular channel associated with at least one network controller of FIG. 1. By way of example, table 90 may contain five rows labeled as: channel 92, NC location 94, service priority 96, latency tolerance 98, and data rate 100. Channel 92 may identify at least one channel associated with at least one network controller. As shown in FIG. 4, channels may number from 1 to M. NC location 94 may identify a location of a network controller corresponding to a particular channel or set of channels. NC location may be expressed in terms of longitude and latitude of the primary user. Thus, for example, channel 1 may be associated with a network controller having a location of 22°/38°. Channel 2 may be associated with a network controller having a location of 30°/45°. Channel 3 may be associated with a network controller having a location of 23°/40°. Although table 90 shows network controller locations in terms of longitude and latitude, other indicators of location may also be used. Table 90 may further include information concerning other attributes associated with the channels. For example, each channel or set of channels may have a service priority 96 associated with it. Channel 1 may have a high service priority, channel 2 may have a low service priority, and channel M may have a medium service priority. Each channel may further have a latency tolerance 98 associated with it. Real time voice/video communication may have a lower latency tolerance than other types of communications. Channel 1 may have a low latency tolerance, channel 2 may have a high latency tolerance, and channel M may have a medium latency tolerance. Although table 90 shows service priority 96 and latency tolerance 98 in relative terms, these attributes may have absolute values, as well. Table 90 may further include information concerning a data rate 100 for each channel or set of channels. Thus, for example, channel 1 may have a data rate of 10 Mb/s, channel 2 may have a data rate of 100 Mb/s, and channel M may have a data rate of 5 Mb/s. Table 90 of interference avoidance database 68 is merely exemplary and may include additional or fewer information. Thus, for example, each channel may not have all of the rows of information associated with it. In other words, some channels may have additional or fewer information categories than the other channels.

Although FIGS. 3 and 4 illustrate two specific tables associated with interference avoidance database 68, interference avoidance database 68 may have additional tables for storing other information. For example, interference avoidance database 68 may have information related to the network load, time period for which channel was clear of radar, and other relevant information.

FIG. 5 is a flowchart of an exemplary method in a communication environment 10. By way of example, this exemplary method may be performed in communication environment 10 by any of network controllers 12, 14, and 16. In one embodiment, one of the network controllers may be designated as a central controller. In that instance, only the central controller may perform the method illustrated in FIG. 5. In one embodiment, interference avoidance algorithm 66, which is stored in memory 64, may perform the method illustrated in FIG. 5. Network controllers 12, 14, and 16 may perform several functions associated with avoiding interference created by other primary users, such as radars, as discussed above with respect to FIGS. 1-4. For example, referring to FIG. 5, a network controller may be initialized (step 120). Initialization may refer to starting up network controller 12 or re-starting network controller 12. Once the network controller is initialized (step 120), the network controller may determine whether an interference avoidance database is available (step 122). As part of this step network controller 12, for example, may determine whether interference avoidance database 68 is stored in memory 64. If not, network controller 12 may download interference avoidance database 68 (step 124). This step may involve network controller 12 prompting a network controller operator to install interference avoidance database 68 and the network controller operator installing interference avoidance database 68. Alternatively, network controller 12 may automatically download interference avoidance database 68 from a remote location, such as a server (not shown). The network controller, for example, network controller 12, may further determine whether it is time to update interference avoidance database (step 126). This step may be performed as soon as the interference avoidance database 68 is downloaded or it may be performed after a predetermined amount of time. In one embodiment, this step may be performed periodically based on a schedule. Alternatively, network controller 12 may ask a mobile node for updates when that mobile node associates with network controller 12. If it is time to update interference avoidance database 68, then network controller may request mobile nodes, such as 30, 32 shown in FIG. 1, for updates (step 130).

In response, mobile nodes may update interference avoidance database 68 (step 132). In one embodiment, mobile nodes may respond to the request for update from mobile nodes and supply the updated information to the network controller. Mobile nodes may also communicate with the network controllers to indicate any interference they detect, as soon as the detection is made. Messages indicating interference may be accorded higher priority over other messages. Any time a new mobile node gets associated with a network controller, it may also supply any interference related information to the network controller. Thus, interference related information stored in interference avoidance database 68 may be updated in real time. The network controller may update interference database 68 upon receipt of any interference avoidance related information. The information provided by mobile nodes may relate to the various information stored in interference database 68. Although FIG. 5 shows a series of specific steps, network controller 12 may not perform all of the steps. In addition, network controller 12 may perform additional steps, not shown in FIG. 5.

By way of example, network controller 12 may perform additional functions, such as scheduling detection periods for mobile nodes, during which the mobile nodes scan for any radars in their vicinity. As part of this function, network controller 12 may instruct a particular mobile node to scan more frequently upon start-up and less frequently later. Network controllers may also investigate a channel on which any interference is detected. For example, network controller 12 may enter a listen mode to continue to monitor a particular channel on which a mobile node may have indicated the presence of interference. This way, network controller 12 may ensure that false detections of interference are not recorded in interference avoidance database 68.

Network controllers, such as network controller 12 may further communicate to each mobile node operating in its service area at least one channel to switch to in case the network controller and the mobile node loose their connection. Mobile nodes may store this information in their local storage (not shown). Network controllers may broadcast this information to mobile nodes via a network beacon.

Furthermore, network controllers may detect adjacent communication networks and coordinate interference avoidance plans. For example, as part of this process network controllers may exchange interference avoidance databases. Moreover, by analyzing the information stored in interference avoidance databases, network controllers may agree upon which channel to switch to and which channels to avoid. To accomplish this functionality, by way of example, interference avoidance database 68 may include a table 150, as shown in FIG. 6. Table 150 of interference avoidance database 68 may be arranged as a table with several rows and columns. Each column may contain information concerning a particular network controller associated with communication network 10 of FIG. 1. By way of example, table 150 may contain four rows labeled as: network controller 152, current channel 154, preferred interference avoidance channels 156, and channels to avoid 158. Network controller 152 may identify at least one network controller (12, 14, and 16, for example) associated with communication network 10. Communication network 10 may include any number of network controllers, for example, from 1 to L. Current channel 154 may identify the current channel that a particular network controller is operating on. Thus, for example, network controller 1 may be operating on channel 6, network controller 2 may be operating on channel 8, network controller 3 may be operating on channel 1, and network controller L may be operating on channel 2. Preferred interference avoidance channels 156 may identify at least one channel (preferably, more than one channel), that a particular network controller should be switched to in case of interference. For example, network controller 1 may be switched to any of the channels 7, 11, and 2, network controller 2 may be switched to any of the channels 3, 1, 4, and 5, network controller 3 may be switched to any of the channels 1, 5, and 6, and network controller L may be switched to any of the channels 3, 7, and 9. Channels to avoid 158 may identify channels that should be avoided when switching channels. For example, network controller 1 may need to avoid channel 5, network controller 2 may need to avoid channel 2, network controller 3 may need to avoid channel 7, and network controller L may need to avoid channel 1. Table 150 of interference avoidance database 68 is merely exemplary and may include additional or fewer information. Thus, for example, each network controller may not have all of the rows of information associated with it. In other words, some network controllers may have additional or fewer information categories than the other network controllers.

In one embodiment, interference avoidance algorithm 66 may process the information stored in tables 70 and 90 of interference avoidance database 68 to generate at least some of the information stored in table 150. Interference avoidance algorithm 66 may pick those channels as the preferred interference avoidance channels that are less likely to interfere with another primary user, such as a radar. Information stored in table 150 may be updated based on a schedule. For example, for a IEEE 802.11 based WLAN, the information stored in table 150 may be updated every minute. For an automotive wireless local area network, the information stored in table 150 may be updated less frequently.

As used herein, the term "bus" is used to refer to a plurality of signals or conductors which may be used to transfer one or more various types of information, such as data, addresses, control, or status. The conductors as discussed herein may be illustrated or described in reference to being a single conductor, a plurality of conductors, unidirectional conductors, or bidirectional conductors. However, different embodiments may vary the implementation of the conductors. For example, separate unidirectional conductors may be used rather than bidirectional conductors and vice versa. Also, plurality of conductors may be replaced with a single conductor that transfers multiple signals serially or in a time multiplexed manner. Likewise, single conductors carrying multiple signals may be separated out into various different conductors carrying subsets of these signals. Therefore, many options exist for transferring signals.

Some of the above embodiments, as applicable, may be implemented using a variety of different information processing blocks. For example, although FIG. 1 and the discussion thereof describe an exemplary information processing architecture, this exemplary architecture is presented merely to provide a useful reference in discussing various aspects of the invention. Of course, the description of the architecture has been simplified for purposes of discussion, and it is just one of many different types of appropriate architectures that may be used in accordance with the invention. Those skilled in the art will recognize that the boundaries between logic blocks are merely illustrative and that alternative embodiments may merge logic blocks or circuit elements or impose an alternate decomposition of functionality upon various logic blocks or circuit elements.

Thus, it is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A method in a communication network comprising a plurality of network controllers and a plurality of mobile nodes served by the plurality of network controllers, the method comprising:
    the plurality of network controllers coordinating interference avoidance by co-operatively generating an interference avoidance database;
    the plurality of network controllers updating the interference avoidance database, wherein updating the interference avoidance database includes receiving interference avoidance related information from the plurality of mobile nodes; and
    the plurality of network controllers communicating the updated interference avoidance database to the plurality of network controllers, wherein the plurality of network controllers function in the communication network in accordance with the interference avoidance related information in the updated interference avoidance database to help the plurality of mobile nodes avoid interference.

2. The method of claim 1 further comprising:
    at least one of the plurality of network controllers detecting whether the interference avoidance database is available in a local storage coupled to the at least one of the plurality of network controllers; and
    if not, the at least one of the plurality of network controllers obtaining a copy of the interference avoidance database.

3. The method of claim 2, wherein obtaining the copy of the interference avoidance database comprises downloading the copy of the interference avoidance database from another network controller designated as having a master copy of the interference avoidance database.

4. The method of claim 2, wherein obtaining the copy of the interference avoidance database comprises receiving the copy of the interference avoidance database from a computer-readable medium containing the interference avoidance database.

5. The method of claim 4, wherein if the at least one of the plurality of network controllers determines that the interference avoidance database needs to be updated, the at least one of the plurality of network controllers requesting at least one mobile node of the plurality of mobile nodes to provide an update for the interference avoidance database.

6. The method of claim 1 further comprising at least one of the plurality of network controllers determining whether the interference avoidance database needs to be updated.

7. The method of claim 1, wherein the interference avoidance database comprises information concerning at least one primary user of a channel corresponding to the communication network.

8. The method of claim 7, wherein the information concerning the at least one primary user of the channel comprises information concerning a radar including at least one of location information, a pulse repetition frequency of the radar, a usage spectrum related to the radar, a signal strength corresponding to the radar, an active time corresponding to the radar, a frequency of activity of the radar, a period of activity of the radar, and a type of the radar.

9. The method of claim 1, wherein the interference avoidance database comprises information concerning at least one channel associated with the communication network.

10. The method of claim 9, wherein the information concerning the at least one channel includes at least one of the plurality of network controllers' location, a service priority associated with the at least one channel, a latency tolerance associated with the at least one channel, and a data rate associated with the at least one channel.

11. The method of claim 1, wherein at least one of the plurality of network controllers communicates to the plurality of mobile nodes at least one schedule for detecting a presence of at least one primary user of at least one channel of the communication network.

12. A method in a communication network comprising a plurality of network controllers and a plurality of mobile nodes served by the plurality of network controllers, the method comprising:
    the plurality of network controllers coordinating interference avoidance by co-operatively generating an interference avoidance database, wherein generating the interference avoidance database comprises exchanging at least one interference avoidance related information between the plurality of network controllers; and
    at least one of the plurality of network controllers generating a channel database, wherein the channel database comprises information concerning a channel for the at least one of the plurality of network controllers that the at least one of the plurality of network controllers may switch to in presence of interference on the channel, wherein the plurality of network controllers functions in the communication network in accordance with the interference avoidance related information in the interference avoidance database and the channel database.

13. The method of claim 12, wherein the interference avoidance database comprises information concerning at least one primary user of a channel corresponding to the communication network.

14. The method of claim 13, wherein the information concerning the at least one primary user of the channel comprises information concerning a radar including at least one of location information, a pulse repetition frequency of the radar, a usage spectrum related to the radar, a signal strength corresponding to the radar, an active time corresponding to the radar, a frequency of activity of the radar, a period of activity of the radar, and a type of the radar.

15. The method of claim 12, wherein the interference avoidance database comprises information concerning at least one channel associated with the communication network.

16. The method of claim 15, wherein the information concerning the at least one channel includes at least one of the plurality of network controllers' location, a service priority associated with the at least one channel, a latency tolerance associated with the at least one channel, and a data rate associated with the at least one channel.

17. A method in a communication network comprising a plurality of network controllers and a plurality of mobile nodes served by at least one of the plurality of network controllers, the method comprising:
    the plurality of network controllers coordinating interference avoidance by co-operatively generating an interference avoidance database, wherein generating the interference avoidance database comprises exchanging at least one interference avoidance related information between the plurality of network controllers, wherein the interference avoidance database comprises information concerning at least one primary user of a channel corresponding to the communication network, and wherein the information concerning the at least one primary user of the channel comprises information concerning a radar including at least one of location information, a pulse repetition frequency of the radar, a usage spectrum related to the radar, a signal strength corresponding to the radar, an active time corresponding to the radar, a frequency of activity of the radar, a period of activity of the radar, and a type of the radar;

at least one of the plurality of network controllers generating a channel database, wherein the channel database comprises information concerning a channel for the at least one of the plurality of network controllers that the at least one of the plurality of network controllers may switch to in the presence of interference on the channel; and the at least one of the plurality of network controllers detecting whether the interference avoidance database is available in a local storage coupled to the at least one of the plurality of network controllers; and if not, the at least one of the plurality of network controllers obtaining a copy of the interference avoidance database.

18. The method of claim 17, wherein obtaining the copy of the interference avoidance database comprises downloading the copy of the interference avoidance database from another network controller designated as having a master copy of the interference avoidance database.

19. The method of claim 17, wherein obtaining the copy of the interference avoidance database comprises receiving the copy of the interference avoidance database from a computer-readable medium containing the interference avoidance database.

* * * * *